Jan. 13, 1953   A. E. KONICK   2,625,676
ELECTRICAL CONTROL CIRCUITS
Filed Feb. 17, 1950   2 SHEETS—SHEET 2
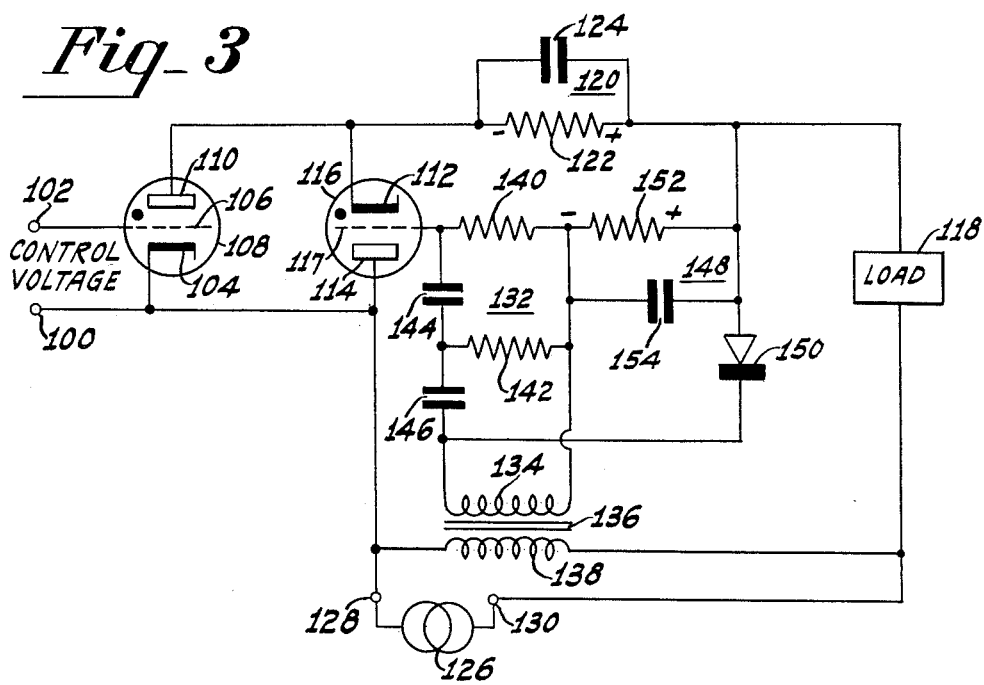
Fig_3
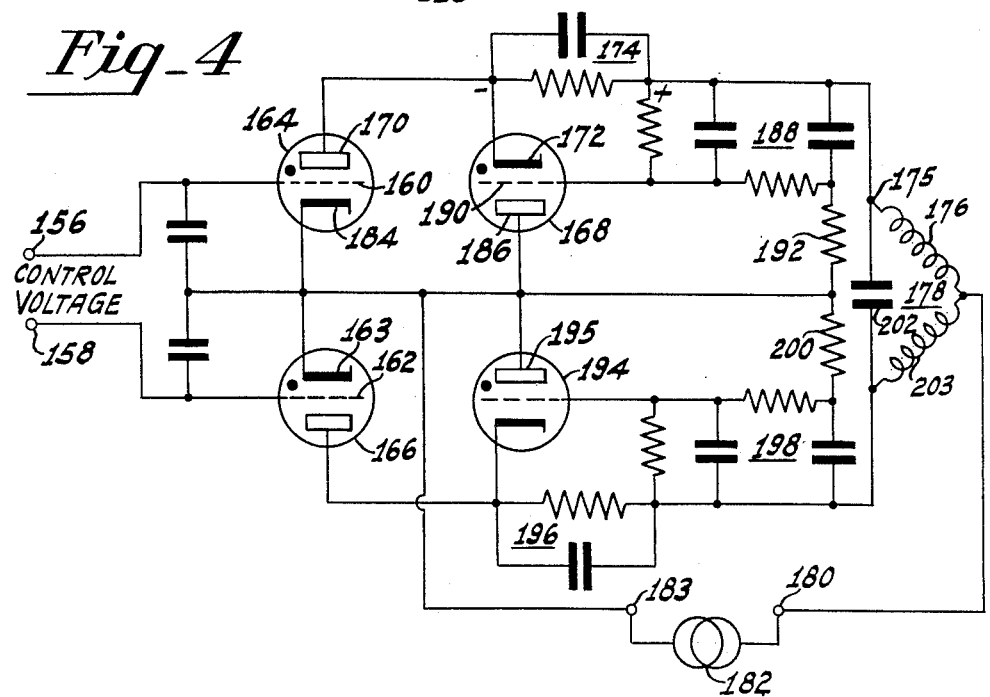
Fig_4
INVENTOR
*Arthur E. Konick*
BY
*J. L. Whittaker*
ATTORNEY Patented Jan. 13, 1953

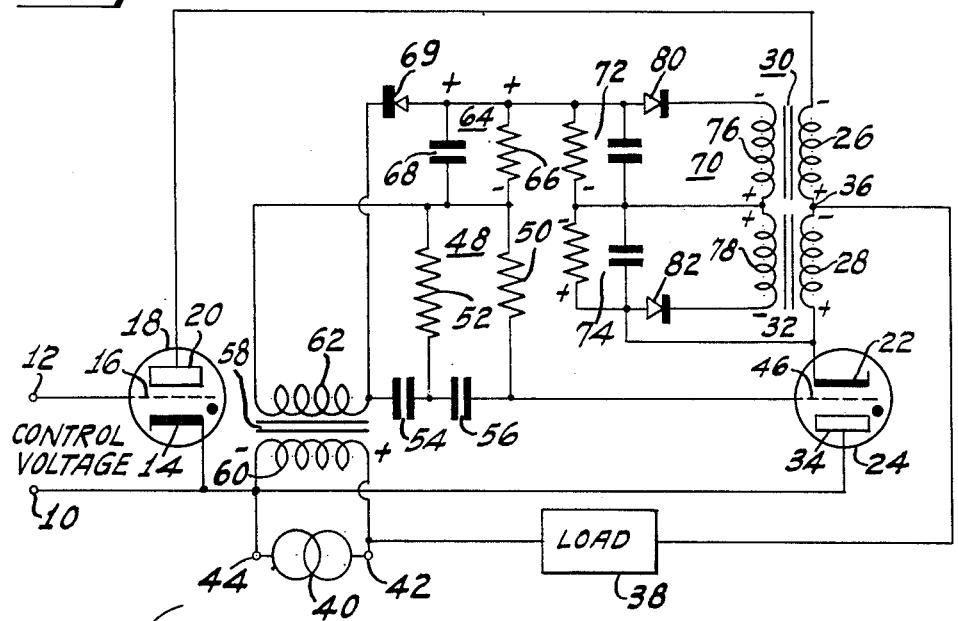
Fig_1
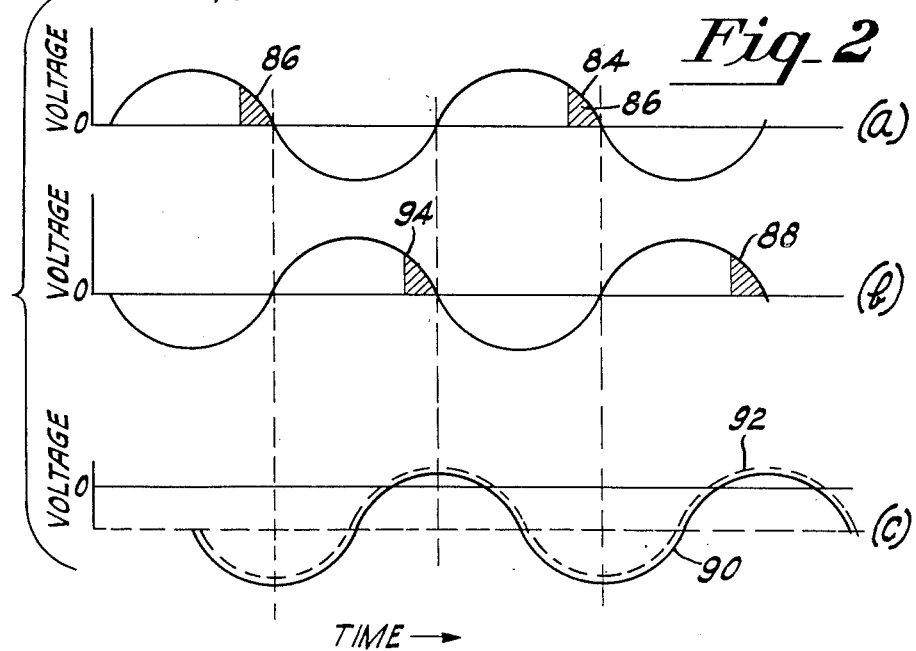
Fig_2
INVENTOR
Arthur E. Konick
ATTORNEY

2,625,676

UNITED STATES PATENT OFFICE 2,625,676

ELECTRICAL CONTROL CIRCUITS

Arthur E. Konick, Collingswood, N. J., assignor to Radio Corporation of America, a corporation of Delaware Application February 17, 1950, Serial No. 144,616

13 Claims. (Cl. 323—24)

This invention relates to control circuits and more particularly to a type of control circuit which may be used with alternating current motors or other alternating current devices where the current to the load is to be controlled by a control voltage.

In control voltage circuits it is frequently desirable where alternating current loads are employed to be able to control the current taken by the load. One conventional means of control is to use a pair of thyratron or other vapor-filled tubes which are fired during alternate half cycles of the alternations of the source of power. The conventional A. C. control circuits usually require heavy duty transformers and furthermore require that the firing time of both tubes of the pair be controlled in order to assure that each tube conduct for substantially equal portions of time thereby each carrying its fair share of the load current.

It is an object of the present invention to provide a control circuit requiring application of control voltage to only one of a pair of tubes.

It is another object of the invention to improve control circuits utilizing a pair of vapor tubes each conductive for a portion of opposite polarity alternations of an alternating current source.

Another object of the invention is to provide a control circuit in which one of a pair of vapor tubes "follows" or has its conduction periods controlled by the conduction periods of the other tube to increase or decrease with the conduction periods of the second tube.

A further object of the invention is to obviate the necessity for a heavy duty transformer and further to obviate entirely in some circuits according to the invention the necessity for a transformer through which the load current is drawn.

These and other objects, advantages, and novel features of the invention will be more apparent from the following description when taken in connection with the accompanying drawing in which:

Fig. 1 is a circuit diagram of one embodiment of the invention in which transformers of comparatively low current carrying capacity may be used;

Fig. 2 is a series of idealized wave forms explanatory of the operation of the invention;

Fig. 3 is another embodiment of the invention in which the necessity for a transformer through which load current passes is obviated; and Fig. 4 is still another embodiment of the invention illustrating its application thereof as a circuit which controls the speed and direction of a two-phase A. C. motor which may be a heavy duty motor.

In accordance with the invention, a pair of tubes has associated with it a circuit which causes the second tube of the pair to increase or decrease conduction periods alternately and in accordance with the increase or decrease respectively of the conduction periods of the first tube of the pair. Thus the conduction periods of the the second tube vary in the same sense as those of the first tube. A first and second tube are connected back-to-back to the load and to a source of alternating current voltage. The first tube has applied to it a control voltage. A control biasing network is connected between the control element and cathode of the second tube and coupled to have developed across the network a voltage tending to make the second tube control element more positive for load current drawn through the first tube and more negative for load current drawn through the second tube. An important feature of the invention is that, by this means, the second tube self-biases itself in response to the conduction periods of the first tube. Thus, tube conduction periods tend to arrive at a condition of equilibrium, whereby said second tube conduction periods preferably are substantially equal to and occur alternately to those of the first tube.

Referring now more particularly to Fig. 1 a control voltage is applied between a pair of terminals 10 and 12 connected respectively to a cathode 14 and a control element 16 of a first vapor-filled tube 18. The anode 20 of the first tube 18 is connected to a cathode 22 of a second vapor-filled tube 24 through the primaries 26 and 28 of transformers 30 and 32 respectively. The anode 34 of the second vapor-filled tube 24 is connected the the cathode 14 of the first vapor-filled tube 18. Thus vapor-filled tubes 18 and 24 are connected in a relationship which is sometimes conventionally termed "back-to-back," that is, with each anode connected to the cathode of the other tube. From the junction 36 between transformer primaries 26 and 28 a connection is made to a load 38 and the other side or terminal of the load is connected to an alternating current source 40 via terminal 42. The other side of the source 40 is connected via terminal 44 to the cathode 14 and anode 34 of vapor-filled tubes 18 and 24 respectively. The back-to-back connected tube combination 18 and 24, the load 38, and the source 40 are thus serially connected.

The control element 46 of the second vapor-filled tube 24 is connected to an A. C. biasing network 48 comprising resistors 50 and 52 and capacitors 54 and 56. The network 48 is connected through a transformer 58 to the source 40, the primary 60 of the transformer 58 being connected to the pair of terminals 42, 44 and the secondary 62 thereof being connected to the A. C. biasing network 48.

The control element 46 of the second gas filled tube 24 is connected also to a D. C. biasing network 64 comprising a resistor 66 connected in parallel with a capacitor 68 and a rectifying element 69. Power for the generation of the D. C. bias across the D. C. bias network 64 is provided from the source 40 by connection to the secondary 62 of the transformer 58.

A control biasing network 70 is connected to the control element 46 through resistors 66 and 50 by connection to the other terminal of resistor 66. The control biasing network 70 includes two parallel resistor-capacitor combinations 72 and 74 connected across the secondaries 76 and 78 respectively of the transformers 30 and 32, through rectifying elements 80 and 82 respectively.

In the operation of the circuit of Fig. 1, the control voltage may be alternating voltage the polarity of which initially is such that the voltage at terminal 12 referred to terminal 10 is out of phase with the voltage at terminal 42 referred to the voltage at terminal 44 (which is assumed the same as that at terminal 10). Thus, under such initial conditions, the voltage of control element 16 of the first vapor-filled tube 18 is 180° out of phase with the voltage on the anode 20 of the tube, and the tube does not fire, assuming that it is suitably biased or has suitable characteristics. In the initial condition, current from the transformer 58 is rectified by rectifying element 69 to develop a voltage across resistor 66 of D. C. biasing network 64 in such a polarity that the control element 46 of the second tube 24 is made negative with respect to the cathode 22. Simultaneously there is applied to the control element 46 through the A. C. biasing network 48 an A. C. voltage which is 90° out of phase with the voltage at the anode 34 of the second vapor-filled tube 24.

Under this initial condition, the bias generated in the D. C. biasing network 64 is sufficient to prevent firing of the second gas-filled tube 24. When the control voltage is advanced in phase with respect to the voltage of the source 40, the voltage at the terminal 12 causes the vapor-filled tube 18 to fire at some latter portion of the half cycle during which the anode 20 thereof is positive with respect to the cathode 14. The voltage on the anode 20 with respect to the cathode 14 of the control tube 18 may be represented by the wave form 84 of graph a of Fig. 2, the shaded areas 86 under the wave form representing the periods of conduction of the first vapor-filled tube 18. The second vapor-filled tube 24 has a voltage applied between its anode 34 and cathode 22 which may be represented by the wave form 88 of graph b of Fig. 2.

As the load current flows through the first gas-filled tube 18, it impresses a voltage across the primary of the transformer 30 and develops a voltage in the control biasing network 70 across the resistor-capacitor combination 72 in the polarity shown in Fig. 1 which tends to make the control element 46 more positive with respect to the cathode 22 of the second gas-filled tube 24. The control element 46 in the initial condition mentioned above has had applied to it a voltage referred to the cathode 22 which may be represented by the solid-line wave form 90 in graph c of Fig. 2 and accordingly has that control element voltage increased in a positive polarity as indicated by the dotted curve 92.

The voltage 90 initially applied to the control element 46 is just insufficient to permit any firing of the second gas-filled tube 24, but when the voltage is increased in a positive polarity as indicated by the wave form 92, the second-gas-filled tube fires at some point in its cycle such as the point 94 on the wave form 88, somewhat before the anode voltage referred to the cathode 22 passes through zero in a negative-going direction. The firing of the gas tube 24 draws load current through the primary 28 of transformer 32, the secondary 78 thereby causing a voltage to develop across the network 74 of the polarity shown in Fig. 1 which tends to make the control element 46 more negative with respect to its cathode 22. Thus the control biasing network 70 is connected to the back-to-back connected tubes 18 and 24 to develop a voltage across the network of a polarity to make the tube 24 fire sooner for the load current drawn through the first tube 18 and to make the second tube 24 fire later for the load current drawn through the second tube 24. A proper choice of circuit parameters and bias voltages which are readily computed from a knowledge of the tube characteristics, not only may be made to cause the second vapor tube 24 to follow the first vapor tube 18 in its conduction periods in the sense that as the periods of conduction of the first tube 18 increase, the periods of conduction of the second tube 24 increase and vice versa, but also the back-to-back connected tubes 18, 24 may be caused to conduct for substantially equal periods of time from a no load to a substantially full load condition. The conduction periods of the gas tubes 18 and 24 quickly reach a condition of equilibrium by self-adjustment of the bias on the gas tube 24, so that the latter not only follows the first tube but follows it with substantially equal and alternately occurring conduction periods. The transformers 30 and 32 are preferably of high, for example 100 to 1, secondary to primary turns ratio. Thus the loading of the circuit by the transformers is minimized.

Referring now more particularly to Fig. 3, a control voltage is applied between the terminals 100 and 102 connected respectively to the cathode 104 and the control element 106 of a first vapor-filled tube 108. The anode 110 and the cathode 104 of the first vapor-filled tube 108 are connected respectively to the cathode 112 and the anode 114 of a second vapor-filled tube 116. The anode 110 and the cathode 112 are connected to a load 118 through a control biasing network 120 comprising a parallel-connected resistor 122 and capacitor 124. A source 126 of alternate current voltage is connected through terminals 128 and 130, respectively, to the connected cathode 104 and anode 114 and to the other side of load 118. Thus, the back-to-back-connected vapor-filled tube combination 108 and 116, the load 118, and the source 126 are serially connected. An A. C. biasing network 132 is connected to the source 126 through the secondary 134 of a transformer 136, the primary 138 of which is connected across the terminals 128, 130. The A. C. biasing network 132 is a phase shifting network comprising resistors 140 and 142 and capacitors 144 and 146. A D. C. biasing network 148 is connected to the secondary 134 of the transformer 136 and includes a rectifying element 150 and a parallel-connected resistor 152 and capacitor 154.

In operation, a control voltage which may be a sinusoidal voltage suitably phased with the voltage of the alternating current source 126, applied between terminals 100 and 102 may cause conduction of the vapor-filled tube 108 over some latter portion of the half cycle during which the anode 110 is positive with respect to the cathode 104. Conduction of these portions of load current through the vapor-filled tube 108 causes a D. C. voltage drop across the control biasing network 120 in the polarity shown which tends to make the control element 117 of the second vapor-filled tube more positive with respect to the associated cathode 112 of the tube 116. The A. C. biasing voltage applied through the network 132 to the control element 117 lags by 90° the voltage of the anode 114 with respect to the cathode 112. Accordingly, as the control element 117 is made more positive by action of the control biasing network 120, the tube 116 tends to fire at an earlier time in its firing cycle. Firing of the vapor-filled tube 116 causes a D. C. voltage drop across the control biasing network 120 in the opposite polarity to that shown, which tends to oppose the voltage set up by the firing of tube 108, making the control element of tube 116 more negative, thereby tending to cause it to fire at a later time in its cycle.

The control biasing network 120 is given a large time constant, which may be 150 or more times the period of the alternations of source 126 whereby the voltages developed across the network 120 change at a much slower rate than the frequency of the alternating current source 126, and may be considered as substantially D. C. by comparison to the source frequency. The control element 117 thus assumes a slowly varying bias which brings tube 116 into equilibrium in its conduction periods with the vapor filled tube 108. Thus, the second vapor-filled tube 116 tends to follow in its conduction periods the first vapor-filled tube 108. The D. C. bias developed across the D. C. biasing network 148 is in the polarity shown and assures that the second tube 116 is biased to be cut off and to have no load current drawn therethrough under conditions when there is no load current being drawn through the first tube 108. It also assures that when the voltage on control element 117 tends to become slightly more positive that the tube 116 begins to carry load current. It will be noted that there is no transformer required in this circuit except the small transformer 136. When the tubes are conducting, the balance maintained is such that there is very little D. C. flowing in the load and therefore the voltage drop across the resistor 122 is small and the power lost is small. The large time constant of the control network 120 may be secured by using a very large capacity for the capacitor 124 by using, for example, low D. C. voltage non-polarized electrolytic capacitors. Two or more of such capacitors may be connected in parallel, if desired, to assure ample time constant and sufficient capacity to carry the load current alternations with low A. C. voltage drop. A low A. C. voltage drop across the control network 120 is highly desirable and important, to assure good operating efficiency, delivery of full voltage to the load motor windings when required, and minimum A. C. losses in the control network.

Referring now more particularly to Fig. 4 which is a circuit according to the invention which may be used for the control of the speed and direction of a two phase alternating current motor. A control voltage is applied between the terminals 156 and 158 connected respectively to the control elements 160 and 162 of the first tubes 164 and 166, respectively of two pairs of vapor-filled tubes. The first tube 164 is connected back-to-back to the second tube 168 of one of the pairs, the anode 170 and cathode 172 of the one pair of tubes 164 and 168 being connected together through a control biasing network 174 to one terminal 175 of a winding 176 of a two-phase A. C. motor 178. The other terminal of winding 176 is connected through a terminal 180 to a source of alternating current 182, the other terminal of which is connected to the cathode 184 and the anode 186 of vapor-filled tubes 164 and 168, respectively. Thus, the one pair of back-to-back connected vapor-filled tubes 164 and 168, the motor winding 176, and the source 182 are serially connected. An A. C. biasing network 188 is connected between the control element 190 of the second vapor-filled tube 168 and the terminal 175. A resistor 192 is connected between the phase shifting A. C. biasing network 188 and the common terminal 183 of the source 182. The other pair of vapor-filled tubes 166 and 194 are connected in a circuit like that connecting the one pair 164, 168. The interconnections of the second pair 166 and 194 include a control biasing network 196, a phase shifting A. C. network 198 and a resistor 200 which are similar to and for like functions, respectively to the network 174, the network 188 and the resistor 192.

From the operation of the one pair of tubes 164, 168, operation of the circuit will be apparent. The control voltage may have the same frequency as the voltage of source 182 and its phase may be such as to cause vapor-filled tube 164 to fire at some point in its cycle. In this event, the control voltage will not cause vapor-filled tube 166 to fire. When tube 164 carries a current, this load current is drawn through the control biasing network 174 developing a bias voltage across network 174 in the polarity shown. This bias voltage tends to make the control element 190 of the second tube 168 of the one pair of tubes to become more positive with respect to its cathode 172. The voltage at terminal 175 is phase shifted by the A. C. biasing network 188 to impress a voltage on control element 190 which lags in phase by 90° the voltage of the anode 186 with respect to the cathode 172. Therefore, the increase in voltage across the network 174 tends to make tube 168 fire at an earlier time in its cycle and the current carried through the tube 168 tends to self-bias the tube to carry the current at a later time in its cycle. The tube 168, therefore, reaches a condition of equilibrium in which its conduction periods follow those of the first tube 164 of the one pair 164, 168. The motor 178, therefore, turns in the direction of rotation which will be caused by current through the winding 176 and through the series combination of capacitor 202 and winding 203. The other pair of tubes 166, 194 operate in a like manner when they are carrying current, but the motor 178 turns in the opposite direction because the capacitor 202 is effective in series with winding 176. When the tubes 164, 168 are carrying current, it is, of course, desired that the tubes 166, 194 do not carry current. The tube 166 does not carry current because the control voltage does not fire it. The cathodes 184, 193 of the first tubes 164 and 166 are connected together and the anodes 186 and 195 of the second tubes are connected together. Signal is applied to control elements 160, 162 in opposite phase, but the anode voltages are in phase. Thus when one of the first tubes 164, 166 is fired, the other is quiescent and not fired. The tube 194 will fire occasionally when the tube 166 is not fired causing a "spike" of current to pass through the tube 194 which current develops a biasing voltage across network 196 which prevents the tube 194 from again firing for several or many cycles. The inertia of the system is such that this current causes no difficulty in the operation of the system and is so small in comparison with the current being carried by the one pair of tubes 164 and 168 that its intermittent passage through tube 194 is negligible. A further advantage of the A. C. biasing networks 188 and 198 lies in the fact that as heavy currents are drawn through the windings of the motor 179 which have the phasing capacitor 202 connected across them, there is usually a phase shift of the voltage across the windings which may tend to cause spurious firing of the following tube on the quiescent side. By taking the bias for tubes 168 and 194 from the voltage that is shifting in phase, the correct relationship between grid and anode voltages is maintained.

It will be apparent from the foregoing that the control circuit described herein obviates the necessity for heavy duty transformers, simplifies the circuitry, and permits the second of a pair of tubes to follow in conduction period the first tube of the pair, and utilizes simple, readily obtained components.

What is claimed is:

1. A control circuit comprising first and second vapor discharge tubes each having an anode, a cathode, and a control element and connected back-to-back with each anode to the cathode of the other tube, a load, means for connecting a source of alternating current of known frequency, said load, and said back-to-back connected tube combination serially, a control biasing network connected in biasing relationship between said second tube cathode and control element and connected to have a biasing voltage developed across said network of one polarity for load current drawn through one of said tubes and of the other polarity for load current drawn through the other of said tubes, and further means to impress an alternating current biasing signal on the control element of said second tube, whereby the conduction periods of said second tube tend to vary in the same sense with that of said first tube.

2. The circuit claimed in claim 1, said network including a resistor network across which the said voltages of opposite polarity are numerically subtracted.

3. A control circuit comprising first and second vapor discharge tubes each having an anode, a cathode, and a control element and connected back-to-back with each anode to the cathode of the other tube, a load, means for connecting a source of alternating current of known frequency, said load, and said back-to-back connected tubes serially, a control biasing network connected in biasing relationship between said second tube cathode and control element and connected to having a biasing voltage developed across said network of one polarity for load current drawn through one of said tubes and of the other polarity for load current drawn through the other of said tubes, said network including a resistor network across which the said voltages of opposite polarity are numerically subtracted and also including capacitors in parallel with the resistors of said resistor network the time constant of said network being greater than a period of the alternations of said source, whereby the conduction periods of said second tube tend to vary in the same sense with that of said first tube.

4. The circuit claimed in claim 1, said D.-C. biasing network comprising a parallel connected resistor and capacitor.

5. The circuit claimed in claim 1, said biasing network being coupled to the load current by transformer coupling.

6. The circuit claimed in claim 1, further comprising an auxiliary D.-C. bias supply to the grid of said second tube.

7. A control circuit comprising first and second vapor discharge tubes each having an anode, a cathode and a control element and directly connected back-to-back with each anode to the cathode of the other tube, a load, a parallel connected resistor capacitor network connected between the directly connected anode of said first tube and cathode of said second tube and said load, means to connect an alternating current source between said load and the directly connected cathode of said first tube and anode of said second tube, and a D.-C. connection from the junction between said resistor capacitor network and said load to the control element of said second tube, whereby said second tube conduction periods occur alternately and are substantially equal to those of said first tube.

8. A control circuit comprising first and second vapor discharge tubes each having an anode, a cathode, and a control element and connected back-to-back, two transformers each having a primary winding with one terminal of one said primary connected to said first tube anode and with one terminal of the other said primary connected to said second tube and with the other said primary terminals connected together at a junction, a load having two terminals said load terminal being connected to said junction, means to connect an alternating current source between the other said load terminal and said first tube cathode and said second tube anode, and a biasing network connected in biasing relationship between said second tube control element and cathode and to the secondaries of said transformers to make said second tube control element more positive for current drawn through said first tube and more negative for current drawn through said second tube, whereby said second tube conduction periods occur alternately and are substantially equal to those of said first tube.

9. A control circuit comprising first and second vapor discharge tubes each having an anode, a cathode and a control element and directly connected back-to-back with each anode to the cathode of the other tube, a parallel connected resistor capacitor network having two terminals one connected to one of said connected anode and cathodes, a load, and means to connect a source of alternating current voltage serially with said tubes, said network, and said load, and a D.-C. connection from the other terminal of said network to that particular control element of that tube of the cathode of which said network one terminal is conneected, whereby said second tube conduction periods occur alternately and are substantially equal to those of said first tube.

10. The circuit claimed in claim 9, further comprising means to impress an alternating current voltage on said particular control element.

11. A control circuit comprising first and second vapor discharge tubes each having an anode, a cathode and a control element and directly connected back-to-back with each anode to the cathode of the other tube, a load, a parallel connected resistor capacitor network, means to connect an alternating current source, said load, said tubes, and said network in a series circuit, a connection means to impress the direct current voltage developed by the flow of current through said tubes and said network between the cathode and control element of one of said tubes, and means to impress a control voltage between the cathode and control element of the other said tube.

12. The circuit claimed in claim 11, further comprising means to apply an alternating current voltage of the same frequency as that of said source between the cathode and control element of said one tube.

13. The circuit claimed in claim 9, the time constant of said network being greater than a period of the alternation of said source.

ARTHUR E. KONICK.

REFERENCES CITED

The following references are of record in the file of this patent:

UNITED STATES PATENTS

| Number | Name | Date |
| --- | --- | --- |
| Re. 20,335 | Lord | Apr. 20, 1937 |
| 1,995,810 | Klemperer | Mar. 26, 1935 |

FOREIGN PATENTS

| Number | Country | Date |
| --- | --- | --- |
| 416,909 | Great Britain | May 27, 1933 |

OTHER REFERENCES

Ser. No. 246,825, abandoned application of Wolf (A. P. C.), published May 18, 1943.